June 4, 1968  M. J. HALPIN  3,386,346
CONTROLLED LEAKAGE PISTON RING ASSEMBLY
Filed April 15, 1966   2 Sheets-Sheet 2

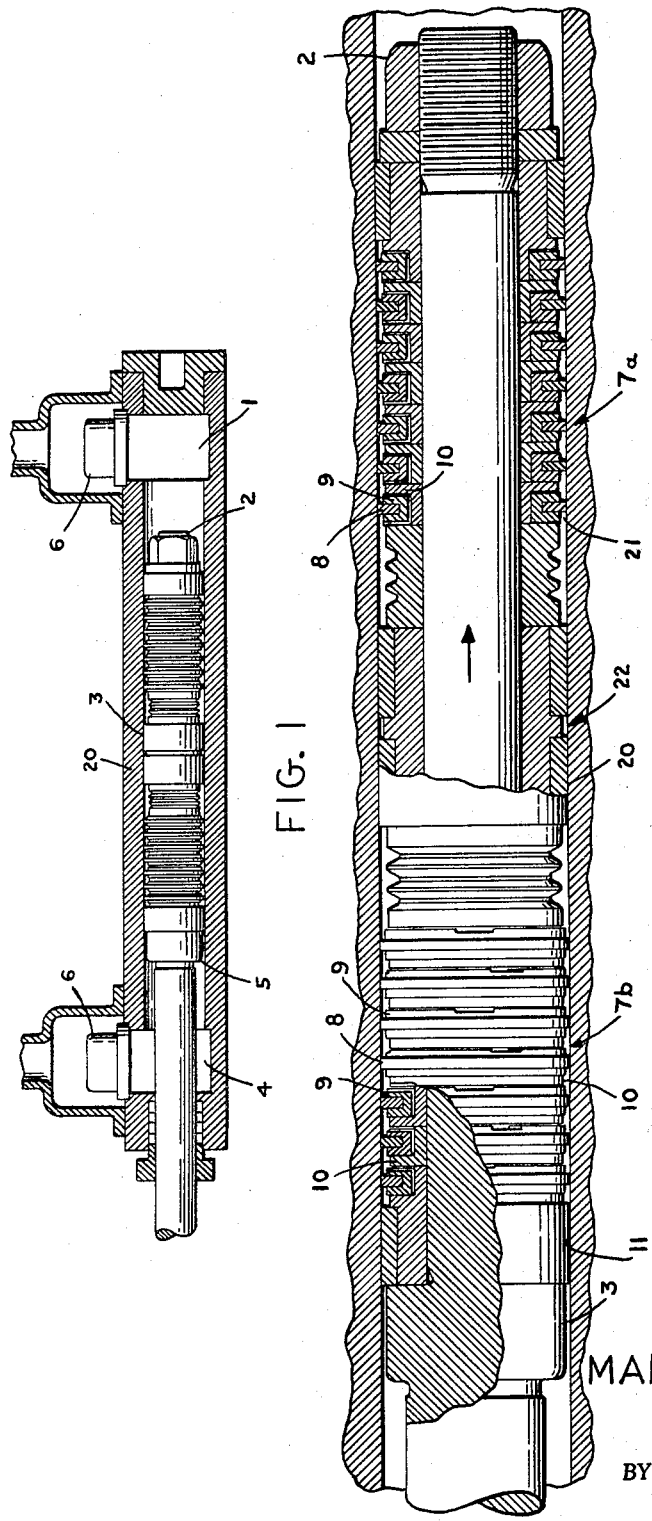

MARTIN J. HALPIN
INVENTOR.
BY Daniel H. Bobis
Atty.

United States Patent Office 3,386,346
Patented June 4, 1968

3,386,346
CONTROLLED LEAKAGE PISTON RING ASSEMBLY
Martin J. Halpin, West Seneca, N.Y., assignor to Worthington Corporation, Harrison, N.J., a corporation of Delaware
Filed Apr. 15, 1966, Ser. No. 542,885
7 Claims. (Cl. 92—183)

ABSTRACT OF THE DISCLOSURE

A controlled leakage piston ring assembly is provided which includes piston ring carriers for mounting the piston rings and passage means for bypassing the said ring only on the compression strokes of the piston to permit controlled leakage and evenly distribute the forces or work loads across the piston rings.

---

This invention relates generally to the piston rings used in the cylinders of reciprocal compressors, and more particularly, to a piston ring carrier for mounting the piston rings on the piston in the cylinder of a non-lubricated reciprocal compressor, which carrier controls the fluid leakage rate passed the piston ring whereby the fluid forces acting against the piston ring are evenly distributed across it.

A non-lubricated reciprocal compressor is one in which there is no oil supply to the parts in the compressor cylinder. The parts in siding contact in the cylinder are made of materials such as Teflon or carbon. In high pressure compressors the forces acting on the piston rings are quite high and the distribution of force, due to pressure, is uneven over a given number of rings. Because of the nature of the materials used, and also because of the uneven distribution of the pressure force, the wear rate of the piston rings is too high to make it economically feasible to operate a high pressure non-lubricated compressor.

Tests on reciprocating compressors have shown that on conventional designs the forces acting on the ring closest to the pressure chamber are the highest. In other words, the first ring does all of the sealing while the succeeding rings do little or no work. Because of this, the first ring wears very rapidly, and the load is then placed on the next ring. This process is repeated until all the rings are worn out. If the load were distributed over enough rings, the force could be kept small enough to realize a permissible wear rate.

In the prior art, grooving has been used on the ring rubbing surface to relieve pressure and promote leakage. This design has been generally unreliable because of dimensional instability caused by the materials used in the piston ring.

In the preferred embodiment of the present invention metal carriers are used for dimensional stability, because of the importance of maintaining proper clearances. An even pressure distribution is attained across the group of piston rings by controlling the leakage rate of pressure fluid through the metal carrier. This carrier can be used with a conventional piston ring.

Accordingly, it is an object of this invention to provide a means for controlling the forces acting on a group of piston rings so that the rings will wear uniformly.

It is another object of this invention to provide a means for controlling the leakage of fluid passed a piston ring in a non-lubricated compressor cylinder.

It is another object of this invention to provide a balanced piston ring loading system for use in double acting reciprocal compressors.

Figure 6:
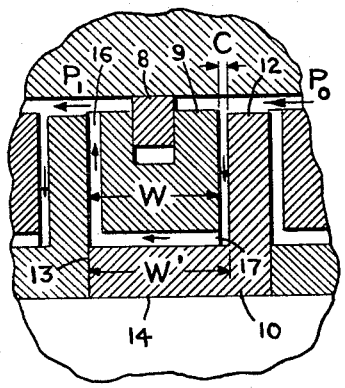
Figure 7:
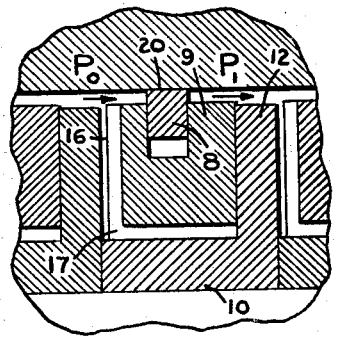
Figures 4, 5:
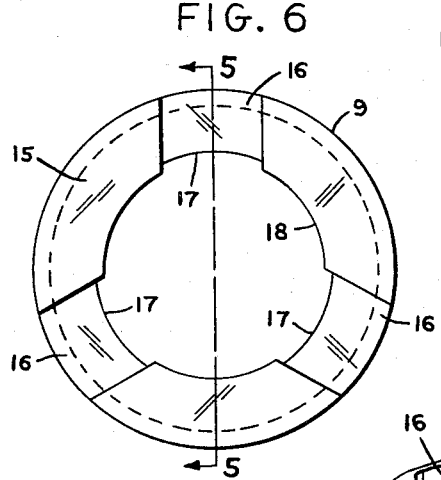
Figure 8:
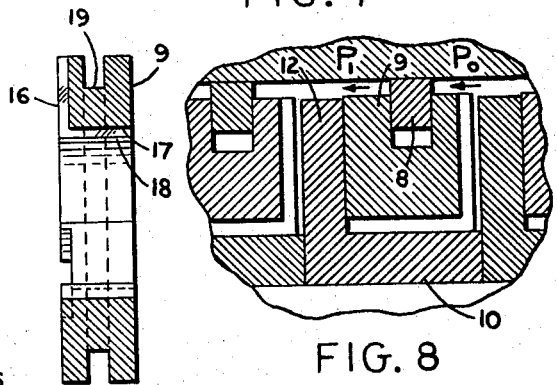
Figure 3:
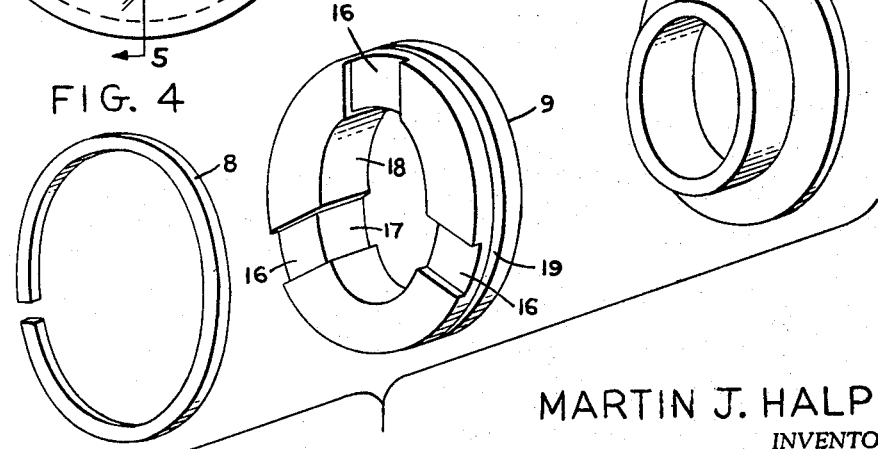

These and other objects of this invention will become evident from the following description with reference to accompanying drawings of which:

FIGURE 1 is a simplified sectional elevation of the piston, cylinder, and valving of a double acting reciprocal compressor;
FIGURE 2 is a detail in partial section of the piston shown in FIGURE 1;
FIGURE 3 is an exploded view of the piston ring assembly as an embodiment of this invention, showing a piston ring, piston ring carrier, and spacer-mounting member;
FIGURE 4 is a plan view of the piston ring carrier shown in FIGURE 3;
FIGURE 5 is a cross section taken along the line 5—5 in FIGURE 4;
FIGURE 6 is an enlarged detail of a part of the cross section of the piston ring assembly as shown in FIGURE 2, depicting the invention in the controlled leakage position;
FIGURE 7 shows the arrangement in FIGURE 6 in the sealed position; and
FIGURE 8 shows the arrangement in FIGURE 7 in reverse.

Referring to the figures, FIGURE 1 is illustrative of a double acting reciprocal compressor, including a cylinder 1 at the head end 2 of a piston 3, and a cylinder 4 at the crank end 5 of the piston 3. Typical compressor valving 6 is also depicted, although the motive force for the compressor piston 3 is not illustrated nor is the remainder of the compressor both of which may be of any conventional type.

The detail of the compressor piston 3 in FIGURE 2 shows two groups of piston ring assemblies 7a and 7b. Each piston ring assembly is more clearly shown in the exploded view of the FIGURE 3. As shown, a conventional piston ring 8 is mounted in the grooved ring carrier 9, which in turn is mounted on a spacer-mounting member 10. The spacer-mounting members 10 are pressed on to the shaft 11 of the piston 3, and are held in place in any conventional manner as shown in FIGURE 2. The piston ring carrier 9 is slideably mounted on the spacer-mounting member 10, and as more clearly shown in FIGURE 6, is narrower in width W than the width W of the mounting portion 14 of the spacer-mounting member 10, thereby providing a clearance space C between the spacer portion 12 and the piston ring carrier 9.

The piston ring carrier 9 is preferably made of metal for dimensional stability. As shown in FIGURE 4 the face 15 of the carrier 9 has a number of radial slots 16 therein. These slots communicate with axial slots 17 in the inner bore 18 of the carrier. The groove 19 in the carrier is of any standard design suitable for accommodating a conventional piston ring.

The piston ring 8 may be of any conventional type, although if used in a non-lubricated compressor, it should be made of Teflon or carbon or any other suitable material.

Operation

The operation of this device can be more clearly illustrated by referring to FIGURES 6, 7, and 8. In FIGURE 6 high pressure gas forces the ring carrier toward the left edge of the piston. Gas flows as shown by the arrows through and around the ring carrier 9. By controlling the clearance C the pressure $P_1$ can in turn be controlled. The difference in pressure $(P_0-P_1)$ determines the force acting on the ring 8.

When the high pressure gas acts from the left as shown in FIGURE 7, it forces the carrier 9 against the spacer portion 12 of the spacer-mounting member 10. Since there is no clearance, the piston ring reacts in the conventional manner. The pressure difference $P_0-P_1$ is solely a function of what leaks by the piston ring between the piston ring 8 and the cylinder wall 20.

The principle thus illustrated by the single piston ring assembly, can be applied to a double acting compressor cylinder, i.e. one in which compression takes place at both the head end and the crank end of the piston cylinder arrangement. A number of the rings are grouped together on either end of the piston shaft 11. As the piston moves (as shown by arrow FIGURE 2) towards the cylinder 1 at the head end 2, the pressure in the cylinder 1 will increase. Fluid leakage will occur through each ring assembly as described in connection with FIGURE 6 of those ring assemblies 7a grouped at the head end 2. At the last ring assembly 21 of this group, the pressure will have fallen far below the cylinder 1 pressure. The pressure in the center section 22 will be at some intermediate value between the maximum cylinder 1 pressure on the head end and a minimum at the crank end 5. The pressure in this space 22 between ring groups 7a and 7b can be monitored through the cylinder wall 20.

The second group of piston rings 7b are subjected to a much lower pressure. They will react as described in FIGURE 7. However, they will have been oriented in the opposite direction as more clearly shown in FIGURE 8.

When the piston 3 moves toward the crank end 5 the pressure builds up in the cylinder 4 and on the left side of the crank end group of piston rings, thereby causing their carriers to slide to the right and allow the clearance space to communicate with the axial slots in the carriers so that a controlled amount of gas will leak passed the piston rings. The piston ring carriers at the head end will have moved to the right to the sealed position as shown in FIGURE 7. Thus the ring groups will have reversed their positions and reacted in the same manner.

By controlling the clearance space C an even pressure distribution is attained across the entire group of rings, thereby providing for uniform ring wear.

It will be understood that various changes in the details, materials, and arrangement of parts which have been herein described and illustrated in order to explain the nature of the invention, may be made by those skilled in the art within the principle and scope of the invention, as expressed in the appended claims.

What is claimed is:

1. A piston ring assembly in combination with a piston-cylinder apparatus, comprising:
   (a) said piston having an annular groove about the circumference thereof;
   (b) an annular member mounted in said annular groove and disposed to move within said annular groove along the longitudinal line of said piston upon movement of said piston;
   (c) said annular member having a groove about the outer circumferential surface thereof;
   (d) a piston ring mounted in said last mentioned groove in sealed contact with said cylinder;
   (e) said annular member having radial passage means in one radial surface thereof and axial passage means in the inner axial bore thereof for permitting gas to pass from one side of the piston ring to the other on the compression stroke of the piston; and
   (f) said annular member having a second radial surface formed so as to be in sealed engagement with said annular groove upon contact therewith for preventing gas from passing from one side of the piston ring to the other on the expansion stroke of the piston.

2. An assembly as in claim 1 wherein the longitudinal clearance between the annular member and the annular groove is dimensionally controlled to control the pressure of the gas passing through the assembly.

3. An assembly as in claim 2 wherein the piston ring is made of Teflon for sliding, non-lubricated contact with said cylinder.

4. A plurality of piston ring assemblies in combination with a piston-cylinder apparatus, comprising:
   (a) said piston having a plurality of annular grooves about the circumference thereof;
   (b) a plurality of annular members, each mounted in a separate annular groove aforesaid, and each disposed to move within its annular groove along the longitudinal line of said piston upon movement of said piston;
   (c) each of said annular members having a groove about the outer circumferential surface thereof;
   (d) a plurality of piston rings each mounted in the groove aforesaid of a separate annular member and each disposed to be in sealed contact with said cylinder;
   (e) each of said annular members having radial passage means in one radial surface thereof and axial passage means in the inner bore thereof for permitting gas to pass from one side of the piston ring to the other on the compression stroke of the piston; and
   (f) each of said annular members having a second radial surface formed so as to be in sealed engagement with its respective annular groove upon contact therewith for preventing gas from passing from one side of the piston ring to the other on the expansion stroke of the piston.

5. A plurality of assemblies as in claim 4 wherein the longitudinal clearance between each annular member and its respective annular groove is dimensionally controlled to control the pressure of the gas passing through each assembly and from assembly to assembly whereby an even pressure distribution is attained across the entire group of piston rings.

6. A plurality of assemblies in claim 5 wherein the piston rings are made of Teflon for sliding, non-lubricated contact with said cylinder.

7. A combination as in claim 5 wherein a group of said piston ring assemblies is disposed on both ends of a double acting piston to permit uniform pressure distribution across the piston rings on the compression stroke at either end.

References Cited

UNITED STATES PATENTS

| | | | |
|---|---|---|---|
| 1,166,644 | 1/1916 | Williams | 277—70 X |
| 1,646,143 | 10/1927 | Forster | 277—173 |
| 1,770,034 | 7/1930 | Hardy | 277—176 |
| 1,808,057 | 6/1931 | Monteagle | 277—173 |
| 1,984,409 | 12/1934 | Godron | 277—173 X |
| 1,988,727 | 1/1935 | Godron | 277—70 |
| 2,260,031 | 10/1941 | Johnston | 277—176 |
| 3,149,543 | 9/1964 | Nabb | 92—258 X |

MARTIN P. SCHWADRON, *Primary Examiner.*

G. N. BAUM, *Assistant Examiner.*